United States Patent
Ghoddoosian et al.

(10) Patent No.: US 12,548,335 B2
(45) Date of Patent: Feb. 10, 2026

(54) WEAKLY SUPERVISED ACTION SEGMENTATION

(71) Applicant: Honda Motor Co., Ltd., Tokyo (JP)

(72) Inventors: Reza Ghoddoosian, San Jose, CA (US); Isht Dwivedi, Mountain View, CA (US); Nakul Agarwal, San Francisco, CA (US); Behzad Dariush, San Ramon, CA (US)

(73) Assignee: Honda Motor Co., Ltd., Tokyo (JP)

( * ) Notice: Subject to any disclaimer, the term of this patent is extended or adjusted under 35 U.S.C. 154(b) by 354 days.

(21) Appl. No.: 18/308,542

(22) Filed: Apr. 27, 2023

(65) Prior Publication Data

US 2024/0371166 A1    Nov. 7, 2024

(51) Int. Cl.
*G06K 9/62* (2022.01)
*G06V 10/774* (2022.01)
(Continued)

(52) U.S. Cl.
CPC ............ *G06V 20/49* (2022.01); *G06V 10/774* (2022.01); *G06V 10/82* (2022.01); *G06V 20/41* (2022.01); *G06V 20/44* (2022.01); *G06V 20/46* (2022.01)

(58) Field of Classification Search
None
See application file for complete search history.

(56) References Cited

U.S. PATENT DOCUMENTS 6,965,861 B1 * 11/2005 Dailey ................ G06F 40/289
                                                          704/9
11,017,556 B2 * 5/2021 Yang ........................ G06T 7/74
(Continued)

FOREIGN PATENT DOCUMENTS

CN      110852256 A   *  2/2020   ............. G06T 7/269
CN      111259775 A   *  6/2020   ........... G06F 18/214
(Continued)

OTHER PUBLICATIONS

Ng et al., "Forecasting future action sequences with attention: a new approach to weakly supervised action forecasting." IEEE Transactions on Image Processing 29 (2020): 8880-8891. (Year: 2020).*
(Continued)

*Primary Examiner* — Feng Niu
(74) *Attorney, Agent, or Firm* — Rankin, Hill & Clark LLP

(57) ABSTRACT

According to one aspect, weakly-supervised action segmentation may include performing feature extraction to extract one or more features associated with a current frame of a video including a series of one or more actions, feeding one or more of the features to a recognition network to generate a predicted action score for the current frame of the video, feeding one or more of the features and the predicted action score to an action transition model to generate a potential subsequent action, feeding the potential subsequent action and the predicted action score to a hybrid segmentation model to generate a predicted sequence of actions from a first frame of the video to the current frame of the video, and segmenting or labeling one or more frames of the video based on the predicted sequence of actions from the first frame of the video to the current frame of the video.

16 Claims, 10 Drawing Sheets

(51) Int. Cl.
　　　*G06V 10/82*　　(2022.01)
　　　*G06V 20/40*　　(2022.01)

(56) References Cited

U.S. PATENT DOCUMENTS

| | | | |
|---|---|---|---|
| 11,055,516 B2* | 7/2021 | Zhu | G06V 20/42 |
| 11,260,872 B2* | 3/2022 | Chen | G06V 20/58 |
| 11,538,564 B2 | 12/2022 | Yao et al. | |
| 11,600,069 B2* | 3/2023 | Lin | G06V 20/49 |
| 11,626,195 B2 | 4/2023 | Lyman et al. | |
| 11,636,681 B2* | 4/2023 | Wang | G06V 20/49 382/159 |
| 11,669,792 B2 | 6/2023 | Lyman et al. | |
| 11,679,500 B2* | 6/2023 | Chen | B25J 13/088 700/250 |
| 11,748,677 B2 | 9/2023 | Prosky et al. | |
| 11,790,297 B2 | 10/2023 | Lyman et al. | |
| 11,790,655 B2* | 10/2023 | Yuan | G06V 10/454 |
| 11,823,106 B2 | 11/2023 | Lyman et al. | |
| 11,887,354 B2 | 1/2024 | Zhang et al. | |
| 11,971,884 B2* | 4/2024 | Aggarwal | G06F 16/248 |
| 12,182,974 B2* | 12/2024 | Nakamura | A61B 1/000095 |
| 12,299,982 B2* | 5/2025 | Gao | G06F 18/2113 |
| 2006/0161814 A1 | 7/2006 | Wocke et al. | |
| 2017/0140285 A1* | 5/2017 | Dotan-Cohen | G06F 9/453 |
| 2019/0102908 A1* | 4/2019 | Yang | G06V 10/82 |
| 2019/0205629 A1* | 7/2019 | Zhu | G06V 20/42 |
| 2020/0114924 A1* | 4/2020 | Chen | B60W 40/09 |
| 2020/0160064 A1* | 5/2020 | Wang | G06V 10/82 |
| 2020/0160176 A1* | 5/2020 | Mehrasa | G06N 3/047 |
| 2020/0160974 A1 | 5/2020 | Yao et al. | |
| 2020/0272823 A1* | 8/2020 | Liu | G06F 18/24317 |
| 2021/0201043 A1* | 7/2021 | Yuan | G06V 10/82 |
| 2021/0216782 A1* | 7/2021 | Lin | G06V 10/764 |
| 2021/0357687 A1* | 11/2021 | Gao | G06F 18/2431 |
| 2022/0180622 A1 | 6/2022 | Zhang et al. | |
| 2022/0184806 A1* | 6/2022 | Chen | B25J 9/1697 |
| 2022/0215915 A1 | 7/2022 | Lyman et al. | |
| 2022/0245141 A1* | 8/2022 | Aggarwal | G06N 3/08 |
| 2022/0261967 A1* | 8/2022 | Nakamura | A61B 1/000095 |
| 2022/0318555 A1* | 10/2022 | Ben-Ari | G06N 3/063 |
| 2022/0327834 A1* | 10/2022 | Liu | G06V 40/20 |
| 2023/0274580 A1* | 8/2023 | Yao | G06V 10/44 382/107 |
| 2023/0386203 A1* | 11/2023 | Girdhar | G06V 20/10 |
| 2024/0292073 A1* | 8/2024 | Khalil | G06V 20/46 |

FOREIGN PATENT DOCUMENTS

| | | | | |
|---|---|---|---|---|
| CN | 115471771 A | * | 12/2022 | G06V 20/41 |
| CN | 115588230 A | * | 1/2023 | G06V 40/20 |

OTHER PUBLICATIONS

Elmi et al., "Deep-Cogn: skeleton-based human action recognition for cognitive behavior assessment." In 2022 IEEE 34th International Conference on Tools with Artificial Intelligence (ICTAI), pp. 692-699. IEEE, 2022. (Year: 2022).*
Ren et al., "Diffnet: Discriminative feature fusion network of multisurface skeleton project images for action recognition." In Proceedings of the 2021 13th International Conference on Machine Learning and Computing, pp. 438-443. 2021. (Year: 2021).*
Ren et al., "CAA: Candidate-Aware Aggregation for Temporal Action Detection." In Proceedings of the 29th ACM International Conference on Multimedia, pp. 4930-4938. 2021. (Year: 2021).*
Burges et al., "Shortest path segmentation: A method for training a neural network to recognize character strings." In Proc. Int. Joint Conf. Neural Networks, vol. 3, pp. 165-172. 1992. (Year: 1992).*
Kuehne et al., "A Hybrid RNN-HMM Approach for Weakly Supervised Temporal Action Segmentation." IEEE Transactions on Pattern Analysis & Machine Intelligence 42, No. 04 (2020): 765-779. (Year: 2020).*
Shen et al., "Semi-Weakly-Supervised Learning of Complex Actions from Instructional Task Videos," 2022 IEEE/CVF Conference on Computer Vision and Pattern Recognition (CVPR), New Orleans, LA, USA, 2022, pp. 3334-3344 (Year: 2022).*
Zou et al., "A Temporal Convolutional Network for Weakly Supervised Action Segmentation," 2021 7th IEEE International Conference on Network Intelligence and Digital Content (IC-NIDC), Beijing, China, 2021, pp. 359-363 (Year: 2021).*
Kuehne et al., "An end-to-end generative framework for video segmentation and recognition." arXiv preprint arXiv:1509.01947 (2016). (Year: 2016).*
CN-110852256-A (machine translation) (Year: 2020).*
CN-111259775-A (machine translation) (Year: 2020).*
CN-115471771-A (machine translation) (Year: 2022).*
CN-115588230-A (machine translation) (Year: 2023).*
Ghoddoosian et al., "Weakly-Supervised Action Segmentation and Unseen Error Detection in Anomalous Instructional Videos," 2023 IEEE/CVF International Conference on Computer Vision (ICCV), Paris, France, 2023, pp. 10094-10104 (Year: 2023).*
Notice of Allowance of U.S. Appl. No. 17/590,379 dated Aug. 7, 2024, 33 pages.
Andra Acsintoae, Andrei Florescu, Mariana-Iuliana Georgescu, Tudor Mare, Paul Sumedrea, Radu Tudor Ionescu, Fahad Shahbaz Khan, and Mubarak Shah. Ubnormal: New benchmark for supervised open-set video anomaly detection. In Proceedings of the IEEE/CVF Conference on Computer Vision and Pattern Recognition, pp. 20143-20153, 2022.
Jean-Baptiste Alayrac, Piotr Bojanowski, Nishant Agrawal, Josef Sivic, Ivan Laptev, and Simon Lacoste-Julien. Unsupervised learning from narrated instruction videos. In Proceedings of the IEEE Conference on Computer Vision and Pattern Recognition, pp. 4575-4583, 2016.
Marcella Astrid, Muhammad Zaigham Zaheer, Jae-Yeong Lee, and Seung-Ik Lee. Learning not to reconstruct anomalies. arXiv preprint arXiv:2110.09742, 2021.
Nadine Behrmann, S Alireza Golestaneh, Zico Kolter, Jürgen Gall, and Mehdi Noroozi. Unified fully and timestamp supervised temporal action segmentation via sequence to sequence translation. In Computer Vision—ECCV 2022: 17th European Conference, Tel Aviv, Israel, Oct. 23-27, 2022, Proceedings, Part XXXV, pp. 52-68. Springer, 2022.
Yizhak Ben-Shabat, Xin Yu, Fatemeh Saleh, Dylan Campbell, Cristian Rodriguez-Opazo, Hongdong Li, and Stephen Gould. The ikea asm dataset: Understanding people assembling furniture through actions, objects and pose. In Proceedings of the IEEE/CVF Winter Conference on Applications of Computer Vision, pp. 847-859, 2021.
Joao Carreira and Andrew Zisserman. Quo vadis, action recognition? a new model and the kinetics dataset. In proceedings of the IEEE Conference on Computer Vision and Pattern Recognition, pp. 6299-6308, 2017.
Chien-Yi Chang, De-An Huang, Yanan Sui, Li Fei-Fei, and Juan Carlos Niebles. D3tw: Discriminative differentiable dynamic time warping for weakly supervised action alignment and segmentation. In Proceedings of the IEEE/CVF Conference on Computer Vision and Pattern Recognition, pp. 3546-3555, 2019.
Xiaobin Chang, Frederick Tung, and Greg Mori. Learning discriminative prototypes with dynamic time warping. In Proceedings of the IEEE/CVF Conference on Computer Vision and Pattern Recognition, pp. 8395-8404, 2021.
Dima Damen, Hazel Doughty, Giovanni Maria Farinella, Antonino Furnari, Evangelos Kazakos, Jian Ma, Davide Moltisanti, Jonathan Munro, Toby Perrett, Will Price, et al. Rescaling egocentric vision: Collection, pipeline and challenges for epic-kitchens-100. International Journal of Computer Vision, pp. 1-23, 2022.
Hanqiu Deng, Zhaoxiang Zhang, Shihao Zou, and Xingyu Li. Bi-directional frame interpolation for unsupervised video anomaly detection. In Proceedings of the IEEE/CVF Winter Conference on Applications of Computer Vision, pp. 2634-2643, 2023.
Ehsan Elhamifar and Zwe Naing. Unsupervised procedure learning via joint dynamic summarization. In Proceedings of the IEEE/CVF International Conference on Computer Vision, pp. 6341-6350, 2019.

(56) References Cited

OTHER PUBLICATIONS

Alireza Fathi, Xiaofeng Ren, and James M Rehg. Learning to recognize objects in egocentric activities. In CVPR 2011, pp. 3281-3288. IEEE, 2011.
Mingfei Gao, Yingbo Zhou, Ran Xu, Richard Socher, and Caiming Xiong. Woad: Weakly supervised online action detection in untrimmed videos. In Proceedings of the IEEE/CVF Conference on Computer Vision and Pattern Recognition, pp. 1915-1923, 2021.
Reza Ghoddoosian, Isht Dwivedi, Nakul Agarwal, Chiho Choi, and Behzad Dariush. Weakly-supervised online action segmentation in multi-view instructional videos. In Proceedings of the IEEE/CVF Conference on Computer Vision and Pattern Recognition, pp. 13780-13790, 2022.
Reza Ghoddoosian, Saif Sayed, and Vassilis Athitsos. Hierarchical modeling for task recognition and action segmentation in weakly-labeled instructional videos. In Proceedings of the IEEE/CVF Winter Conference on Applications of Computer Vision (WACV), pp. 1922-1932, Jan. 2022.
Hilde Kuehne, Ali Arslan, and Thomas Serre. The language of actions: Recovering the syntax and semantics of goaldirected human activities. In Proceedings of the IEEE conference on computer vision and pattern recognition, pp. 780-787, 2014.
Hilde Kuehne, Alexander Richard, and Juergen Gall. Weakly supervised learning of actions from transcripts. Computer Vision and Image Understanding, 163:78-89, 2017.
Anna Kukleva, Hilde Kuehne, Fadime Sener, and Jurgen Gall. Unsupervised learning of action classes with continuous temporal embedding. In Proceedings of the IEEE/CVF Conference on Computer Vision and Pattern Recognition, pp. 12066-12074, 2019.
Dongha Lee, Sehun Yu, Hyunjun Ju, and Hwanjo Yu. Weakly supervised temporal anomaly segmentation with dynamic time warping. In Proceedings of the IEEE/CVF International Conference on Computer Vision, pp. 7355-7364, 2021.
Sangmin Lee, Hak Gu Kim, and Yong Man Ro. Bman: Bidirectional multi-scale aggregation networks for abnormal event detection. IEEE Transactions on Image Processing, 29:2395-2408, 2019.
Jun Li, Peng Lei, and Sinisa Todorovic. Weakly supervised energy-based learning for action segmentation. In Proceedings of the IEEE/CVF International Conference on Computer Vision, pp. 6243-6251, 2019.
Yin Li, Miao Liu, and JamesMRehg. In the eye of beholder: Joint learning of gaze and actions in first person video. In Proceedings of the European conference on computer vision (ECCV), pp. 619-635, 2018.
Zijia Lu and Ehsan Elhamifar. Weakly-supervised action segmentation and alignment via transcript-aware union-ofsubspaces learning. In Proceedings of the IEEE/CVF International Conference on Computer Vision, pp. 8085-8095, 2021.
Didik Purwanto, Yie-Tarng Chen, and Wen-Hsien Fang. Dance with self-attention: A new look of conditional random fields on anomaly detection in videos. In Proceedings of the IEEE/CVF International Conference on Computer Vision, pp. 173-183, 2021.
Yicheng Qian, Weixin Luo, Dongze Lian, Xu Tang, Peilin Zhao, and Shenghua Gao. Svip: Sequence verification for procedures in videos. In Proceedings of the IEEE/CVF Conference on Computer Vision and Pattern Recognition, pp. 19890-19902, 2022.
Alexander Richard, Hilde Kuehne, and Juergen Gall. Weakly supervised action learning with rnn based fine-to-coarse modeling. In Proceedings of the IEEE conference on Computer Vision and Pattern Recognition, pp. 754-763, 2017.
Alexander Richard, Hilde Kuehne, Ahsan Iqbal, and Juergen Gall. Neuralnetwork-viterbi: A framework for weakly supervised video learning. In Proceedings of the IEEE conference on Computer Vision and Pattern Recognition, pp. 7386-7395, 2018.
Nicolae-Cătălin Ristea, Neelu Madan, Radu Tudor Ionescu, Kamal Nasrollahi, Fahad Shahbaz Khan, Thomas B Moeslund, and Mubarak Shah. Self-supervised predictive convolutional attentive block for anomaly detection. In Proceedings of the IEEE/CVF Conference on Computer Vision and Pattern Recognition, pp. 13576-13586, 2022.

Marcus Rohrbach, Anna Rohrbach, Michaela Regneri, Sikandar Amin, Mykhaylo Andriluka, Manfred Pinkal, and Bernt Schiele. Recognizing fine-grained and composite activities using hand-centric features and script data. International Journal of Computer Vision, 119(3):346-373, 2016.
Yaser Souri, Yazan Abu Farha, Fabien Despinoy, Gianpiero Francesca, and Juergen Gall. Fifa: Fast inference approximation for action segmentation. In DAGM German Conference on Pattern Recognition, pp. 282-296. Springer, 2021.
Yaser Souri, Mohsen Fayyaz, Luca Minciullo, Gianpiero Francesca, and Juergen Gall. Fast weakly supervised action segmentation using mutual consistency. IEEE Transactions on Pattern Analysis and Machine Intelligence, 2021.
Sebastian Stein and Stephen J McKenna. Combining embedded accelerometers with computer vision for recognizing food preparation activities. In Proceedings of the 2013 ACM international joint conference on Pervasive and ubiquitous computing, pp. 729-738, 2013.
Yansong Tang, Dajun Ding, Yongming Rao, Yu Zheng, Danyang Zhang, Lili Zhao, Jiwen Lu, and Jie Zhou. Coin: A large-scale dataset for comprehensive instructional video analysis. In Proceedings of the IEEE Conference on Computer Vision and Pattern Recognition, pp. 1207-1216, 2019.
Kamalakar Vijay Thakare, Yash Raghuwanshi, Debi Prosad Dogra, Heeseung Choi, and Ig-Jae Kim. Dyannet: A scene dynamicity guided self-trained video anomaly detection network. In Proceedings of the IEEE/CVF Winter Conference on Applications of Computer Vision, pp. 5541-5550, 2023.
Xiang Wang, Shiwei Zhang, Zhiwu Qing, Yuanjie Shao, Zhengrong Zuo, Changxin Gao, and Nong Sang. Oadtr: Online action detection with transformers. In Proceedings of the IEEE/CVF International Conference on Computer Vision, pp. 7565-7575, 2021.
Jhih-Ciangwu, He-Yen Hsieh, Ding-Jie Chen, Chiou-Shann Fuh, and Tyng-Luh Liu. Self-supervised sparse representation for video anomaly detection. In Computer Vision—ECCV 2022: 17th European Conference, Tel Aviv, Israel, Oct. 23-27, 2022, Proceedings, Part XIII, pp. 729-745. Springer, 2022.
Guang Yu, Siqi Wang, Zhiping Cai, Xinwang Liu, Chuanfu Xu, and Chengkun Wu. Deep anomaly discovery from unlabeled videos via normality advantage and self-paced refinement. In Proceedings of the IEEE/CVF Conference on Computer Vision and Pattern Recognition, pp. 13987-13998, 2022.
Christopher Zach, Thomas Pock, and Horst Bischof. A duality based approach for realtime tv-l 1 optical flow. In Joint pattern recognition symposium, pp. 214-223. Springer, 2007.
Astrid, and Seung-Ik Lee. Claws: Clustering assisted weakly supervised learning with normalcy suppression for anomalous event detection. In Computer Vision—ECCV 2020: 16th European Conference, Glasgow, UK, Aug. 23-28, 2020, Proceedings, Part XXII 16, pp. 358-376. Springer, 2020.
M Zaigham Zaheer, Arif Mahmood, M Haris Khan, Mattia Segu, Fisher Yu, and Seung-Ik Lee. Generative cooperative learning for unsupervised video anomaly detection. In Proceedings of the IEEE/CVF Conference on Computer Vision and Pattern Recognition, pp. 14744-14754, 2022.
Yuansheng Zhu, Wentao Bao, and Qi Yu. Towards open set video anomaly detection. In Computer Vision—ECCV 2022: 17th European Conference, Tel Aviv, Israel, Oct. 23-27, 2022, Proceedings, Part XXXIV, pp. 395-412. Springer, 2022.
Dimitri Zhukov, Jean-Baptiste Alayrac, Ramazan Gokberk Cinbis, David Fouhey, Ivan Laptev, and Josef Sivic. Crosstask weakly supervised learning from instructional videos. In Proceedings of the IEEE/CVF Conference on Computer Vision and Pattern Recognition, pp. 3537-3545, 2019.
Yazan Abu Farha and Juergen Gall. Uncertainty-aware anticipation of activities. In Proceedings of the IEEE/CVF International Conference on Computer Vision Workshops, pp. 0-0, 2019.
Chien-Yi Chang, De-An Huang, Danfei Xu, Ehsan Adeli, Li Fei-Fei, and Juan Carlos Niebles. Procedure planning in Instructional videos. arXiv preprint arXiv:1907.01172, 2019.
Junyoung Chung, Caglar Gulcehre, KyungHyun Cho, and Yoshua Bengio. Empirical evaluation of gated recurrent neural networks on sequence modeling. arXiv preprint arXiv:1412.3555, 2014.

(56) References Cited

OTHER PUBLICATIONS

K Deepak, G Srivathsan, S Roshan, and S Chandrakala. Deep multi-view representation learning for video anomaly detection using spatiotemporal autoencoders. Circuits, Systems, and Signal Processing, 40(3):1333-1349, 2021.

Li Ding and Chenliang Xu. Weakly-supervised action segmentation with iterative soft boundary assignment. In Proceedings of the IEEE Conference on Computer Vision and Pattern Recognition, pp. 6508-6516, 2018.

Hyunjun Eun, Jinyoung Moon, Jongyoul Park, Chanho Jung, and Changick Kim. Learning to discriminate information for online action detection. In Proceedings of the IEEE/CVF Conference on Computer Vision and Pattern Recognition, pp. 809-818, 2020.

Chenyou Fan, Jangwon Lee, Mingze Xu, Krishna Kumar Singh, Yong Jae Lee, David J Crandall, and Michael S Ryoo. Identifying first-person camera wearers in thirdperson videos. In Proceedings of the IEEE Conference on Computer Vision and Pattern Recognition, pp. 5125-5133, 2017.

Yazan Abu Farha and Jurgen Gall. Ms-tcn: Multi-stage temporal convolutional network for action segmentation. In Proceedings of the IEEE/CVF Conference on Computer Vision and Pattern Recognition, pp. 3575-3584, 2019.

Antonino Furnari and Giovanni Maria Farinella. What would you expect? anticipating egocentric actions with rollingunrolling lstms and modality attention. In Proceedings of the IEEE/CVF International Conference on Computer Vision, pp. 6252-6261, 2019.

Jiyang Gao, Zhenheng Yang, and Ram Nevatia. Red: Reinforced encoder-decoder networks for action anticipation. arXiv preprint arXiv:1707.04818, 2017.

Mingfei Gao, Mingze Xu, Larry S Davis, Richard Socher, and Caiming Xiong. Startnet: Online detection of action start in untrimmed videos. In Proceedings of the IEEE/CVF International Conference on Computer Vision, pp. 5542-5551, 2019.

Shang-Hua Gao, Qi Han, Zhong-Yu Li, Pai Peng, Liang Wang, and Ming-Ming Cheng. Global2local: Efficient structure search for video action segmentation. In Proceedings of the IEEE/CVF Conference on Computer Vision and Pattern Recognition, pp. 16805-16814, 2021.

Reza Ghoddoosian, Saif Sayed, and Vassilis Athitsos. Action duration prediction for segment-level alignment of weaklylabeled videos. In Proceedings of the IEEE/CVF Winter Conference on Applications of Computer Vision, pp. 2053-2062, 2021.

Sanjay Haresh, Sateesh Kumar, Huseyin Coskun, Shahram N Syed, Andrey Konin, Zeeshan Zia, and Quoc-Huy Tran. Learning by aligning videos in time. In Proceedings of the IEEE/CVF Conference on Computer Vision and Pattern Recognition, pp. 5548-5558, 2021.

Hsuan-I Ho, Wei-Chen Chiu, and Yu-Chiang Frank Wang. Summarizing first-person videos from third persons' points of view. In Proceedings of the European Conference on Computer Vision (ECCV), pp. 70-85, 2018.

Yuchi Ishikawa, Seito Kasai, Yoshimitsu Aoki, and Hirokatsu Kataoka. Alleviating over-segmentation errors by detecting action boundaries. In Proceedings of the IEEE/CVF Winter Conference on Applications of Computer Vision, pp. 2322-2331, 2021.

Qiuhong Ke, Mario Fritz, and Bernt Schiele. Timeconditioned action anticipation in one shot. In Proceedings of the IEEE/CVF Conference on Computer Vision and Pattern Recognition, pp. 9925-9934, 2019.

Sateesh Kumar, Sanjay Haresh, Awais Ahmed, Andrey Konin, M Zeeshan Zia, and Quoc-Huy Tran. Unsupervised activity segmentation by joint representation learning and online clustering. 2021.

Yaman Kumar, Mayank Aggarwal, Pratham Nawal, Shin'ichi Satoh, Rajiv Ratn Shah, and Roger Zimmermann. Harnessing ai for speech reconstruction using multi-view silent video feed. In Proceedings of the 26th ACM international conference on Multimedia, pp. 1976-1983, 2018.

Zhe Li, Yazan Abu Farha, and Jurgen Gall. Temporal action segmentation from timestamp supervision. In Proceedings of the IEEE/CVF Conference on Computer Vision and Pattern Recognition, pp. 8365-8374, 2021.

Yunyu Liu, Lichen Wang, Yue Bai, Can Qin, Zhengming Ding, and Yun Fu. Generative view-correlation adaptation for semi-supervised multi-view learning. In European Conference on Computer Vision, pp. 318-334. Springer, 2020.

Tahmida Mahmud, Mahmudul Hasan, and Amit K Roy-Chowdhury. Joint prediction of activity labels and starting times in untrimmed videos. In Proceedings of the IEEE International conference on Computer Vision, pp. 5773-5782, 2017.

Jingjing Meng, Suchen Wang, Hongxing Wang, Junsong Yuan, and Yap-Peng Tan. Video summarization via Multiview representative selection. In Proceedings of the IEEE International Conference on Computer Vision Workshops, pp. 1189-1198, 2017.

Rameswar Panda and Amit K Roy-Chowdhury. Multi-view surveillance video summarization via joint embedding and sparse optimization. IEEE Transactions on Multimedia, 19(9):2010-2021, 2017.

Paritosh Parmar and Brendan Tran Morris. What and how well you performed? a multitask learning approach to action quality assessment. In Proceedings of the IEEE Conference on Computer Vision and Pattern Recognition, pp. 304-313, 2019.

Florent Perronnin and Christopher Dance. Fisher kernels on visual vocabularies for image categorization. In 2007 IEEE conference on computer vision and pattern recognition, pp. 1-8. IEEE, 2007.

AJ Piergiovanni and Michael S Ryoo. Recognizing actions in videos from unseen viewpoints. In Proceedings of the IEEE/CVF Conference on Computer Vision and Pattern Recognition, pp. 4124-4132, 2021.

Sanqing Qu, Guang Chen, Dan Xu, Jinhu Dong, Fan Lu, and Alois Knoll. Lap-net: Adaptive features sampling via learning action progression for online action detection. arXiv preprint arXiv:2011.07915, 2020.

Charles Ringer and Mihalis A Nicolaou. Deep unsupervised multiview detection of video game stream highlights. In Proceedings of the 13th International Conference on the Foundations of Digital Games, pp. 1-6, 2018.

Saquib Sarfraz, Naila Murray, Vivek Sharma, Ali Diba, Luc Van Gool, and Rainer Stiefelhagen. Temporally-weighted hierarchical clustering for unsupervised action segmentation. In Proceedings of the IEEE/CVF Conference on Computer Vision and Pattern Recognition, pp. 11225-11234, 2021.

Fadime Sener, Dipika Singhania, and Angela Yao. Temporal aggregate representations for long-range video understanding. In European Conference on Computer Vision, pp. 154-171. Springer, 2020.

Fadime Sener and Angela Yao. Unsupervised learning and segmentation of complex activities from video. In Proceedings of the IEEE Conference on Computer Vision and Pattern Recognition, pp. 8368-8376, 2018.

Pierre Sermanet, Corey Lynch, Yevgen Chebotar, Jasmine Hsu, Eric Jang, Stefan Schaal, Sergey Levine, and Google Brain. Timecontrastive networks: Self-supervised learning from video. In 2018 IEEE international conference on robotics and automation (ICRA), pp. 1134-1141. IEEE, 2018.

Zheng Shou, Junting Pan, Jonathan Chan, Kazuyuki Miyazawa, Hassan Mansour, Anthony Vetro, Xavier Giro-I Nieto, and Shih-Fu Chang. Online detection of action start in untrimmed, streaming videos. In Proceedings of the European Conference on Computer Vision (ECCV), pp. 534-551, 2018.

Gunnar A Sigurdsson, Abhinav Gupta, Cordelia Schmid, Ali Farhadi, and Karteek Alahari. Actor and observer: Joint modeling of first and third-person videos. In Proceedings of the IEEE Conference on Computer Vision and Pattern Recognition, pp. 7396-7404, 2018.

Andrew Viterbi. Error bounds for convolutional codes and an asymptotically optimum decoding algorithm. IEEE transactions on Information Theory, 13(2):260-269, 1967.

Shruti Vyas, Yogesh S Rawat, and Mubarak Shah. Multiview action recognition using cross-view video prediction. In ECCV, pp. 427-444. Springer, 2020.

Dongang Wang, Wanli Ouyang, Wen Li, and Dong Xu. Dividing and aggregating network for multi-view action recognition. In ECCV, pp. 451-467, 2018.

(56) References Cited

OTHER PUBLICATIONS

Heng Wang and Cordelia Schmid. Action recognition with improved trajectories. In Proceedings of the IEEE international conference on computer vision, pp. 3551-3558, 2013.

Lichen Wang, Zhengming Ding, Zhiqiang Tao, Yunyu Liu, and Yun Fu. Generative multi-view human action recognition. In Proceedings of the IEEE/CVF International Conference on Computer Vision, pp. 6212-6221, 2019.

Zhenzhi Wang, Ziteng Gao, Limin Wang, Zhifeng Li, and Gangshan Wu. Boundary-aware cascade networks for temporal action segmentation. In European Conference on Computer Vision, pp. 34-51. Springer, 2020.

Bo Xiong, Haoqi Fan, Kristen Grauman, and Christoph Feichtenhofer. Multiview pseudo-labeling for semi-supervised learning from video. arXiv preprint arXiv:2104.00682, 2021.

Mingze Xu, Mingfei Gao, Yi-Ting Chen, Larry S Davis, and David J Crandall. Temporal recurrent networks for online action detection. In Proceedings of the IEEE/CVF International Conference on Computer Vision, pp. 5532-5541, 2019.

Mingze Xu, Yuanjun Xiong, Hao Chen, Xinyu Li, Wei Xia, Zhuowen Tu, and Stefano Soatto. Long short-term transformer for online action detection. arXiv preprint arXiv:2107.03377, 2021.

Bowen Zhang, Hao Chen, Meng Wang, and Yuanjun Xiong. Online action detection in streaming videos with time buffers. arXiv preprint arXiv:2010.03016, 2020.

Peisen Zhao, Lingxi Xie, Ya Zhang, Yanfeng Wang, and Qi Tian. Privileged knowledge distillation for online action detection. arXiv preprint arXiv:2011.09158, 2020.

* cited by examiner

WEAKLY SUPERVISED ACTION SEGMENTATION

BACKGROUND

Supervised and unsupervised learning models work in unique ways. The supervised learning approach in machine learning (ML) uses labeled datasets that train algorithms to classify data or predict outputs precisely. The model uses the labeled data, which is typically human labeled, to measure the relevance of different features to gradually improve model fit to the known outcome. With unsupervised learning, ML algorithms are used to examine and group unlabeled datasets. Such algorithms may uncover unknown patterns in data without human supervision. However, unsupervised learning sometimes produces erroneous results. On the other hand, supervised learning may be costly, time consuming, and may require human expertise for label validation. Generally, action segmentation aims to segment a temporally untrimmed video by time, and label each segmented part with a pre-defined action label.

BRIEF DESCRIPTION

According to one aspect, a system for weakly-supervised action segmentation may include a memory and a processor. The memory may store one or more instructions. The processor may execute one or more of the instructions stored on the memory to perform one or more acts, actions, or steps. For example, the processor may perform feature extraction to extract one or more features associated with a current frame of a video including a series of one or more actions, feeding one or more of the features to a recognition network to generate a predicted action score for the current frame of the video, feeding one or more of the features and the predicted action score to an action transition model to generate a potential subsequent action, and feeding the potential subsequent action and the predicted action score to a hybrid segmentation model to generate a predicted sequence of actions from a first frame of the video to the current frame of the video.

The hybrid segmentation model may generate the predicted sequence of actions based on a predicted action length for a predicted action associated with the predicted action score. The action transition model may generate the potential subsequent action based on a transcript of one or more known sequences of actions, one or more of the features, and the predicted action score. The hybrid segmentation model may generate a predicted sequence of action lengths corresponding to the predicted sequence of actions. The processor may detect one or more errors associated with the predicted sequence of action length and the predicted sequence of actions based on an error function. The hybrid segmentation model may be based on an unconstrained Viterbi algorithm. The action transition model may generate the potential subsequent action based on feeding one or more of the features to an anticipation network to generate an expected action for the current frame of the video and based on a comparison between the expected action for the current frame and the predicted action for the current frame. If the comparison is greater than a similarity threshold, generating the potential subsequent action based on a transcript of one or more known sequences of actions. If the comparison is less than a similarity threshold, generating the potential subsequent action based on exploring a universe of possible actions. The anticipation network of the action transition model may be trained during a training phase associated with a constrained version of the hybrid segmentation model.

According to one aspect, a computer-implemented method for weakly-supervised action segmentation may include performing feature extraction to extract one or more features associated with a current frame of a video including a series of one or more actions, feeding one or more of the features to a recognition network to generate a predicted action score for the current frame of the video, feeding one or more of the features and the predicted action score to an action transition model to generate a potential subsequent action, and feeding the potential subsequent action and the predicted action score to a hybrid segmentation model to generate a predicted sequence of actions from a first frame of the video to the current frame of the video.

The hybrid segmentation model may generate the predicted sequence of actions based on a predicted action length for a predicted action associated with the predicted action score. The action transition model may generate the potential subsequent action based on a transcript of one or more known sequences of actions, one or more of the features, and the predicted action score. The hybrid segmentation model may generate a predicted sequence of action lengths corresponding to the predicted sequence of actions. The computer-implemented method for weakly-supervised action segmentation may include detecting one or more errors associated with the predicted sequence of action length and the predicted sequence of actions based on an error function. The hybrid segmentation model may be based on an unconstrained Viterbi algorithm.

According to one aspect, a system for weakly-supervised action segmentation may include a memory and a processor. The memory may store one or more instructions. The processor may execute one or more of the instructions stored on the memory to perform one or more acts, actions, or steps. For example, the processor may perform feature extraction to extract one or more features associated with a current frame of a video including a series of one or more actions, feeding one or more of the features to a recognition network to generate a predicted action score for the current frame of the video, feeding one or more of the features and the predicted action score to an action transition model to generate a potential subsequent action, feeding the potential subsequent action and the predicted action score to a hybrid segmentation model to generate a predicted sequence of actions from a first frame of the video to the current frame of the video, and segmenting or labeling one or more frames of the video based on the predicted sequence of actions from the first frame of the video to the current frame of the video.

The hybrid segmentation model may generate the predicted sequence of actions based on a predicted action length for a predicted action associated with the predicted action score. The action transition model may generate the potential subsequent action based on a transcript of one or more known sequences of actions, one or more of the features, and the predicted action score. The hybrid segmentation model may generate a predicted sequence of action lengths corresponding to the predicted sequence of actions.

DETAILED DESCRIPTION

Figure 1:
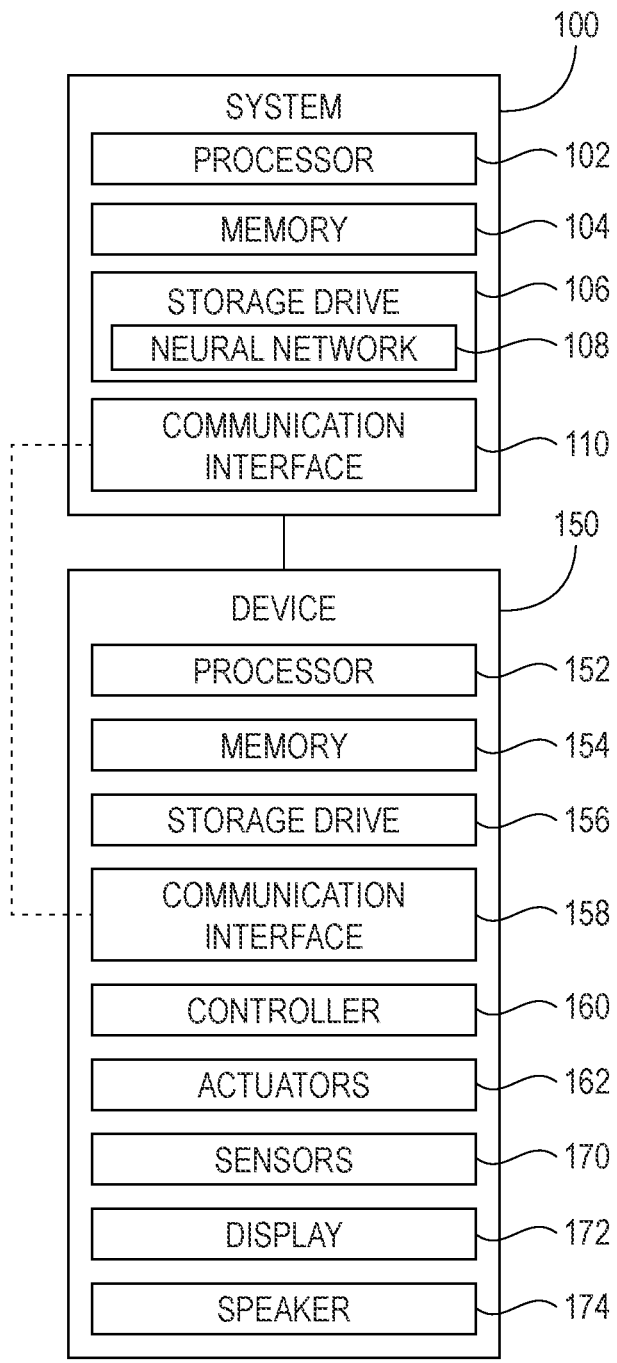
FIG. 1 is an exemplary component diagram of a system for weakly-supervised action segmentation, according to one aspect.

The following includes definitions of selected terms employed herein. The definitions include various examples and/or forms of components that fall within the scope of a term and that may be used for implementation. These examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

One of the challenges in human machine interaction may be in automatic vision-based understanding of human actions in instructional videos. These videos often depict a series of low-level actions that collectively accomplish a high-level task, such as preparing a meal or assembling an object or an item. However, labeling each frame of these videos may be arduous and may utilize a significant amount of manual effort to note the start and end times of each action segment. Consequently, there is interest in developing weakly supervised methods to learn the actions. In particular, such methods aim to overcome the challenge of weakly labeled instructional videos, where merely the ordered sequence of action labels (e.g., transcript) may be provided without any information on the duration of each action.

Detection of fine errors and anomalies in tasks performed by human operators may be useful for enhancing quality of work and efficiency. Anomalies may take different forms. According to one aspect, an anomaly may include a fine-grained sequential anomaly in an instructional video. Sequential anomalies may be defined as unseen action sequences that arise due to unexpected permutations (e.g., changes to the order of actions, addition of one or more actions, omission of one or more actions, etc.) in the action sequences seen in the training set. Explained yet again, such permutations may include unexpected changes in the order of actions, or the omission or addition of one or multiple actions at any point in the video. An error may be defined as a sequential anomaly that leads to an undesired outcome and may include an inaction, according to one aspect. This means that not all sequential anomalies are indicative of faulty procedures. The anomalous sequences may or may not entail assembly errors. Although the system for weakly-supervised action segmentation is described in the context of object or item assembly, other aspects are contemplated (e.g., any order based operation, such as cooking, etc.).

Examples of these unseen variations or anomalies at test time may include scenarios where an assembly worker skips fastening a screw or spends too much time idling between actions. It may be desirable to have artificial intelligence systems trained on limited or smaller sets of data, but these systems should be capable of detecting out-of-sequence actions (e.g., anomalies) or interruptions in situations or scenarios where inexperienced workers make mistakes (e.g., unintended actions) or follow sub-optimal sequences. According to one aspect, the system for weakly-supervised action segmentation may implement one or more actions via a controller, actuators, displays, speakers, etc. by notifying a worker when an anomaly has occurred at a test time or during an execution phase.

FIG. 1 is an exemplary component diagram of a system 100 for weakly-supervised action segmentation, according to one aspect. The system 100 for weakly-supervised action segmentation may include a processor 102, a memory 104, a storage drive 106 storing one or more neural networks 108, and a communication interface 110. The memory 104 may store one or more instructions. The processor 102 may execute one or more of the instructions stored on the memory 104 to perform one or more acts, actions, or steps. During a training phase, the communication interface 110 may receive a video (e.g., training video) and a video transcript (e.g., training transcript) and the system 100 for weakly-supervised action segmentation may build or train a weakly-supervised action segmentation model based thereon. Videos presented to the system 100 for weakly-supervised action segmentation may have their features extracted. For example, the processor 102 may perform feature extraction to extract one or more features associated with a current frame of a video including a series of one or more actions.

A transcript or training transcript may be a known (e.g., correct) ordered sequence of action labels or a known sequence of actions. For example, with reference to assembly of an object or item, examples of actions or action classes may include fasten screw, insert screw, take block, take part, fasten nut, take ring, take plate, tighten screw, spin block, insert pin, balance part, drop, pickup, hammer pin, etc. It will be appreciated that other actions may be classified according to other aspects. According to one aspect, the transcript may include cross-task variations rather than intra-task anomalies.

During an execution phase or a test phase, the system 100 for weakly-supervised action segmentation may receive a video (e.g., test video) and generate a predicted sequence of actions from a first frame of the video to the current frame of the video based on the received video (e.g., test video).

According to one aspect, the training video may include participants who assemble one or more toys in an expected and consistent manner. On the other hand, the test video and validation sets may include participants who display anomalies in their assembly of toys, including sequence variations, defects, or redundancies. Although the test video and training videos may include the same set of actions, the action sequences of the test video may be distinct and previously unseen relative to the training video.

The training video and/or the transcript may include frame-wise spatial annotations of human errors, atomic actions, human poses, segmentation annotations by frame for non-anomalous, anomalous without error, and anomalous with error videos, and bounding boxes of interactive objects for one or more videos of different tasks, such as assembly tasks. Additionally, temporal action labels, video-level error labels, object bounding boxes, and human poses may be provided. Temporal action labels may be annotated the start and end frames of action segments in each video in addition to the action transcripts.

Video-level error labels may be indicative of sequential anomalies which may, despite the error, still demonstrate a valid and complete assembly sequence. Unseen errors that occurred during the assembly of each object in the test video may be identified and labeled. Each test video may be annotated with one or more video-level error labels that indicate error classes present in the video. Object bounding boxes may be indicative of objects that each participant touches for the frames. Human pose may be modeled based on a number of joints for human participants.

The system 100 for weakly-supervised action segmentation may or may not include a device 150. The device 150 may be utilized for capturing the video (e.g., either the training video or the test video) or be utilized for implementing an action based on the predicted sequence of actions. The device 150 may include a processor 152, a memory 154, a storage drive 156, a communication interface 158 (e.g., which may be in computer communication or communicatively coupled with the communication interface 110 of the system 100 for weakly-supervised action segmentation), a controller 160, one or more actuators 162, one or more sensors 170 (e.g., video sensor, image capture sensor, etc.), a display 172, a speaker 174.

Weakly-supervised action segmentation and unseen error detection may be provided for anomalous instructional videos. Examples of instructional videos or 'videos' herein may include untrimmed videos of participants assembling different items, for example. These videos may be recorded or presented from various viewpoints.

During the training phase, videos presented to the system 100 for weakly-supervised action segmentation may not include anomalies. Stated another way, given a fixed set of non-anomalous training transcripts, the system 100 for weakly-supervised action segmentation may explore and infer unseen anomalous sequences at test time. Again, an anomaly may include one or more previously unseen (e.g., not from a training transcript) action sequences that arise due to unexpected permutations of the action sequences seen in the training set. Additionally, during the training phase, a weakly labeled segmentation algorithm may be introduced. For example, the segmentation algorithm may be implemented in a segmentation model which may be a generalization of a constrained version of the Viterbi algorithm and may identify potential anomalous moments based on the difference between future anticipation and current recognition results, as will be discussed in greater detail with reference to FIG. 2.

During the test phase, validation phase, or execution phase, videos presented to the system 100 for weakly-supervised action segmentation may include anomalies, such as sequential anomalies, defined as unexpected permutations of the training transcripts, such as redundant actions (e.g., inserting an extra screw or unexpected background segments between actions), skipped actions (e.g., not tightening a screw), and major changes in the order of training action subsequences (e.g., when the last phase of an assembly is performed at the beginning of the video).

The segmentation algorithm may be implemented in a segmentation model which may be a generalization of an unconstrained version of the Viterbi algorithm, which may act as an alignment mechanism to align unseen transcripts to the video and identify potential anomalous moments based on the difference between future anticipation and current recognition results. The unconstrained version of the segmentation model may be a hybrid segmentation model and may be an unconstrained Viterbi algorithm that enables real-time segmentation of videos into unseen action sequences. In this way, inference of anomalous action sequences while maintaining real-time performance may be possible.

The majority of weakly-supervised action segmentation methods may be limited by the training transcripts. Specifically, most cannot predict unseen transcripts because they iterate through training transcripts to find the best alignment with the test video. An RNN may be trained to predict the video transcript offline, but the RNN remains biased by the training transcripts and unable to generalize well to unexpected transcript variations.

One advantage or benefit of the weakly-supervised action segmentation described herein may be that it is not restricted by the training transcripts during testing, thereby allowing for the inference of anomalous action sequences while maintaining real-time performance. Well-being of individuals may be enhanced by movement monitoring or action monitoring using the weakly-supervised action segmentation. Additionally, quality of work may be improved in the technical areas of manufacturing and task assembly. Based on these segmentation results, pre-defined human errors that occur during assembly may be detected. Examples of errors which may be detected with reference to assembly of an object or item may include idle time, unfastened leg, dropped item without picking up item, missing leg, missing ring, unfastened screw, extra screw, no balancing, missing screw, missing part, extra ring, etc. It will be appreciated that other errors may be classified according to other aspects.

Weakly-Supervised Action Segmentation Formulation

The processor 102 of the system may perform weakly-supervised action segmentation tasks discussed herein. Given a set of training videos $\mathbb{V}$ and corresponding transcripts $\mathcal{T}_s$, a goal may be to partition a test video into sequences of n actions $$a_1^n \in \mathcal{T}_u$$

and their duration $$l_1^n$$

$\mathcal{T}_u$ may be the set of unseen test transcripts, and may be based on the anomaly assumption, $\mathcal{T}_u \cap \mathcal{T}_s = \emptyset$. $\mathbb{A}$ may be defined as the set of $|\mathbb{A}|$ unique actions labels and $$x_1^t$$

the sequence of frame-level features from the beginning of video until time t.

Weakly-Supervised Action Segmentation Model

Given trained parameters and extracted features $$x_1^t$$

of a test video, Equation (1) below, may be utilized to approximate the likelihood of n action segments with labels $a_1^n$ and durations $l_1^n$ until time t. In Equation (1), $p(x_t|a_{n_t})$ may be the visual model, and may be derived using the Bayes rule on top of the probability output of a recognition network. $n_t$ may be the segment number at time t. Thus, the processor 102 may perform feeding one or more of the features to a recognition network to generate a predicted action score for the current frame of the video.

The probability of transitioning into action segment ń>1 at time $$t'_{\acute{n}} = \sum_{1}^{\acute{n}-1} l_{\hat{n}}$$

may be modeled by $$p\left(a_{\acute{n}} \big| a^{\acute{n}-1}, x_1^{t'_{\acute{n}}}\right).$$

The action transition model described herein may depend on the context of video at the transition point $t_{\acute{n}}$ in addition to previous action labels $$a^{\acute{n}-1}.$$

This may facilitate detection of anomalous segments unlike previous works, where action transition occurs merely according to the set of seen training transcripts $\mathcal{T}_s$. Finally, $$p_{mode}^{\acute{n}}(l|a)$$

may be the length model of segment ń, and may estimate the probability of action a lasting l frames.

$$p_{mode}(a_1^n, l_1^n | x_1^t) \approx \prod_{i=1}^{t} p\left(x_i | a_{n_i}\right) \prod_{\acute{n}=1}^{n} p_{mode}^{\acute{n}}(l_{\acute{n}} | a_{\acute{n}}) p\left(a_{\acute{n}} | a_1^{\acute{n}-1}, x_1^{t'_{\acute{n}}}\right) \quad (1)$$

Equation (1) addresses segmentation for both modes of offline (e.g., off) and online (e.g., on). In offline segmentation, t marks the end of $a_n$. Meanwhile, in the online mode, the last segment n may be ongoing, so t may not mark the end of the current action. Hence, the difference between both modes may be the choice of the length model $p^n_{mode}(l|a)$ for the last segment n. While $p'^n_{off}(l|a)$ may be a Poisson function in offline segmentation for $p^n_{on}(l|a)$ for merely the last segment n. Poissons may be parameterized by the estimated average length of actions.

Action Transition Model

Let $\vec{A}_t=[p(c_t|x_{t-\omega};\theta_a), \forall c \in \mathbb{A}]$ be the "anticipated" or future action anticipation probability vector for time t given past features at time t-$\omega$. Also, $\vec{R}_t=[p(c_t|x_t;\theta_r), \forall c \in \mathbb{A}]$ may denote the "current" action recognition probability vector for time t. $\vec{A}_t$ and $\vec{R}_t \in \mathbb{R}^{|\mathbb{A}|}$ may be outputs of anticipation and recognition networks, parameterized by $\theta_a$ and $\theta_r$ respectively. Thus, the processor 102 may perform feeding one or more of the features and the predicted action score to an action transition model to generate a potential subsequent action. The action transition model may generate the potential subsequent action based on a transcript of one or more known sequences of actions, one or more of the features, and the predicted action score.

Anomalous behavior may be detected by the discrepancy between the expected and current action representations $\vec{A}_t$ and $\vec{R}_t$ respectively. Actions that typically occur temporally close to each other may be also more similar in their visual representations. Equation (2) may connect similarity between action representations to their temporal positions.

$\mathbb{E}_\tau(a_1^{\acute{n}-1}, t_{\acute{n}})$ may be the set of possible action labels for segment ń at transition point $t_{\acute{n}}$ given the previous labels $a_1^{\acute{n}-1}$. In Equation (2), $s(a,b)$ may be the cosine similarity of two vectors, and $\mathcal{N}^+_{\mathcal{T}_s}\{a_i^j\}$ may return the set of all actions that succeed sequence $a_i^j$ according to the training transcripts $\mathcal{T}_s$ or all successors for action sequence $a_i^j$.

$$\mathbb{E}_\tau(a_1^{\acute{n}-1}, t_{\acute{n}}) = \begin{cases} \mathcal{N}^+_{\mathcal{T}_s}\{LCS(a_1^{\acute{n}-1}, \mathcal{T}_s)\} & \text{if } \tau < s(\vec{R}_{t_{\acute{n}}}, \vec{A}_{t_{\acute{n}}}) \\ \mathbb{A} & \text{otherwise} \end{cases} \quad (2)$$

Dissimilar anticipated and current action probability vectors may indicate an anomalous transition, so deviation from the transcripts may be allowed by exploring the set of all possible actions $\mathbb{A}$. Otherwise, action transitions may follow the sequences in the training transcripts. In this case, the set of all possible actions may be equal to the set of all actions that succeed the Longest Common Subsequence (LCS)

$a_i^{\acute{n}-1}$ between the previous sequence $a_1^{\acute{n}-1}$ and the training transcripts $\mathcal{T}_s$. The transition model may be a special case when $\tau=0$, because in this case deviation from training transcripts never occurs and the LCS may be always $a_1^{\acute{n}-1}$.

Ultimately, in Equation (1), $$p(a_{\acute{n}}|a_1^{\acute{n}-1}, x_1^{t_{\acute{n}}}) = 1 \text{ if } a_{\acute{n}} \in \mathbb{E}_\tau(a_1^{\acute{n}-1}, t_{\acute{n}}),$$

and may be 0 otherwise.

In this way, a constrained dynamic approach and a greedy approach are implemented by Equation (2). The greedy approach may be represented by the set of all possible actions $\mathbb{A}$, which may be utilized when an anomaly is detected. The constrained dynamic approach may be utilized when no anomaly is detected, an inference may be made based on the most likely sequence of actions from the set of training sequences or training transcript. The constrained algorithm may return a transcript sequence of actions and durations, and thus, exist in the training or transcript universe.

Hybrid Segmentation Model (Unconstrained Viterbi Algorithm)

Algorithm 1, provided herein, may efficiently solve both online and offline segmentation of Equation (1) at each time step t. At each time step t, dynamic programming and the results from the previous time step may be used to generate new segmentation results. Each new sequence may be the result of either continuing the last action or transitioning into a new one. The hybrid segmentation model may be based on an unconstrained Viterbi algorithm. Different than the constrained Viterbi algorithm from the training phase, the execution phase Viterbi algorithm may be unconstrained, because it may be not limited to the training transcripts. This may be useful for inferring unseen and anomalous action sequences. Specifically, $$P_t[l_n, a_1^n]$$

may be defined as the probability of the most likely alignment of sequence $$a_1^n$$

with video frames until time t, so that $a_n$ may be incomplete and have a duration of $l_n$. The mostly likely segmentation result $$(\bar{a}_1^n, \bar{l}_1^n)_{mode} = \mathrm{argmax}\{P_t[\hat{l}_{\hat{n}}, \hat{a}_1^{\hat{n}}] \cdot p_{mode}^{\hat{n}}(\hat{l}_{\hat{n}}|\hat{a}_{\hat{n}})\}$$

may be derived once at the end of video for offline segmentation, and at every time step during online inference. However, merely the current action $a_t = \bar{a}_n$ may be selected as the online inference output of time t.

Thus, the processor 102 may perform feeding the potential subsequent action and the predicted action score to a hybrid segmentation model to generate a predicted sequence of actions from a first frame of the video to the current frame of the video. The hybrid segmentation model may generate the predicted sequence of actions based on a predicted action length for a predicted action associated with the predicted action score. The hybrid segmentation model may generate a predicted sequence of action lengths corresponding to the predicted sequence of actions.

In order to achieve real time performance, separately for each action $a \in \mathbb{A}$ at time t, merely the set of top B likely segmentation results $$S_t^B(a)$$

ending with action a may be kept (e.g., by pruning excess options). Such an action-wise pruning gives the online segmentation method the advantage to infer any possible action, which might have been pruned out otherwise. The overall complexity of Algorithm 1 at each time step may be $O(B|\mathbb{A}|(\log B + |\mathbb{A}|))$. This complexity may be the result of enumerations in addition to the sorting complexity of $\mathrm{top}^B\{$ $\}$ with beam size B.

---

ALGORITHM 1 (Unconstrained Viterbi Algorithm at time t)

Input: video features $x_1^t$ and past results: $P_{t-1}$ and $S_{t-1}^B$

Output: $P_t, S_t^B$ and the current action $\bar{a}_n$

1:     for $a \in \mathbb{A}$ do:

2:         for $(a_1^n, l_1^n) \in S_{t-1}^B(a)$ do:

3:             $P_t[l_n + 1, a_1^n] = P_{t-1}[l_n, a_1^n] \cdot p(x_t | a)$

4:             for $a_{n+1} \in \mathbb{E}_T(a_1^n, t)$ do:

---

ALGORITHM 1 (Unconstrained Viterbi Algorithm at time t)

5:               $Q[l_n, a_1^{n+1}] = P_{t-1}[l_n, a_1^n] \cdot p(l_n | a) \cdot p(x_t | a_{n+1})$ 6:     $\forall a_1^n : P_t[1, a_1^n] = \mathrm{max}_{l_{n-1}}\{Q[\hat{l}_{n-1}, a_1^n]\}$ 7:     $\bar{a}_n = \mathrm{argmax}_{\hat{a}_{\hat{n}} \in \mathbb{A}} \left\{ \max_{\hat{l}_{\hat{n}}, \hat{a}_1^{\hat{n}-1}} \{P_t[\hat{l}_{\hat{n}}, \hat{a}_1^{\hat{n}}] \cdot p_{on}^{\hat{n}}(\hat{l}_{\hat{n}}|\hat{a}_{\hat{n}})\} \right\}$ 8:     $\forall a \in \mathbb{A} : S_t^B(a) = \left\{ (\hat{a}_1^{\hat{n}}, \hat{l}_1^{\hat{n}}) \middle| P_t[\hat{l}_{\hat{n}}, \hat{a}_1^{\hat{n}}] \in \mathrm{top}^B\{P_t[:,:]\} \wedge \hat{a}_{\hat{n}} = a \right\}$ return $S_t^B, P_t, \bar{a}_n$

---

Weakly-Supervised Training

A weakly-supervised framework may be used to train the anticipation and recognition networks in an iterative fashion. Given a video of length T and its transcript per iteration, training may be done following two steps. First, frame-level pseudo labels $\bar{a}_1^T$ may be estimated through offline segmentation in Equation (1) during the training phase. Second, the pseudo labels may be used in a loss function $\mathcal{L}$ to update the parameters $\theta_a$ and $\theta_r$ of the anticipation, and recognition networks respectively. The Constrained Discriminative Forward Loss $\mathcal{L}_{CDFL}$ may be employed, which effectively maximizes the decision margin between valid and hard invalid pseudo labels. In Equation (3), $\mathcal{L}_{CDFL}$ may be applied to the recognition outputs $$\vec{R}_1^T$$

of all frames and to the anticipation output $$\vec{A}_\omega^T,$$

weighted by $\lambda_a$, for frames from $\omega$ to T, where $\omega$ may be the future anticipation range.

$$\mathcal{L} = \mathcal{L}_{CDFL}(\bar{a}_1^T, \vec{R}_1^T) + \lambda_a \mathcal{L}_{CDFL}(\bar{a}_\omega^T, \vec{A}_\omega^T) \quad (3)$$

Error Detection

Problem Definition: a goal in error detection may be to identify if and the number of times $n_e$ an error $e \in \varepsilon$ has occurred in a test video. $\varepsilon$ may be the set of unseen error categories that may be only present in the test video. The dataset provides detailed instructions I of what each error may be when performing a task, e.g., the error label "missed leg" may mean using less than 4 legs to assemble a table. It may be not clear how to temporally locate all errors because certain errors correspond to inaction. Also, some errors may be inferred when the video has ended, e.g. not picking up an item that may be dropped in the process. As a result, detect errors at the end of the video after the task may be fully observed.

Overview: a simple error detection method may be provided as a set of error functions $\{\mathcal{F}_e\}$, so that each function $$\mathcal{F}_e : f \xrightarrow{I} n_e$$

maps frequency f of inferred actions in the test video to the number of instances $n_e$ that error e has occurred. Here, $f=\{f_a\}$, and $f_a$ may be the number of predicted video segments labeled by action a. For example, the function for the error label "Loose Screw" may be defined as $\mathcal{F}_{Loose\ Screw} := \max(f_{insert\ screw} - f_{fasten\ nut}, 0)$. Thus, the processor 102 may detect one or more errors associated with the predicted sequence of action length and the predicted sequence of actions based on an error function.

For each test video, two different segmentation results $S^0$ and $S^\tau$ may be generated for $\tau=0$ and $\tau>0$ respectively. The $S^0$ may represent the constrained offline segmentation as a reference, where the estimated transcript may be one of the training transcripts. Then, the respective set of action frequencies $f^0$ and $f^\tau$ may be calculated from the segmentation results $S^0$ and $S^\tau$. Finally, $f^0$ and $f^\tau$ may be incorporated in Equation (4) to produce if and how many times each error e has happened:

$$n_e = \mathcal{F}_e(f^\tau) \times \underbrace{(1 - \min(\mathcal{F}_e(f^0), 1))}_{b} \qquad (4)$$

Error functions may operate based on action frequencies and may not consider the semantics of the video. In other words, error functions may not consider the assembly type. Stated yet another way, the same behavior may be erroneous in task A and may be error free in task B. As a result, the reference action frequency $f^0$ may be used to focus on relevant errors and alleviate false positives. Therefore, to remove false positives, a behavior is considered erroneous only if it is error free in its corresponding training transcript. Specifically, term b in Equation (4) may condition the result based on the action frequency discrepancy between the predicted anomalous transcript and its corresponding non-anomalous training transcript. In other words, an erroneous behavior may be detected in the anomalous segmentation result if the same behavior is error-free in the estimated non-anomalous transcript of the video, e.g., skipping action a in a test video may be considered an error if action a has occurred in its non-anomalous reference $S^0$.

According to one aspect, the processor 102 may perform segmenting or labeling one or more frames of the video based on the predicted sequence of actions from the first frame of the video to the current frame of the video. According to one aspect, the processor 102 may notify a worker when an anomaly has occurred at a test time or during an execution phase utilizing the display 172 or the speaker 174, for example.

Figure 2:
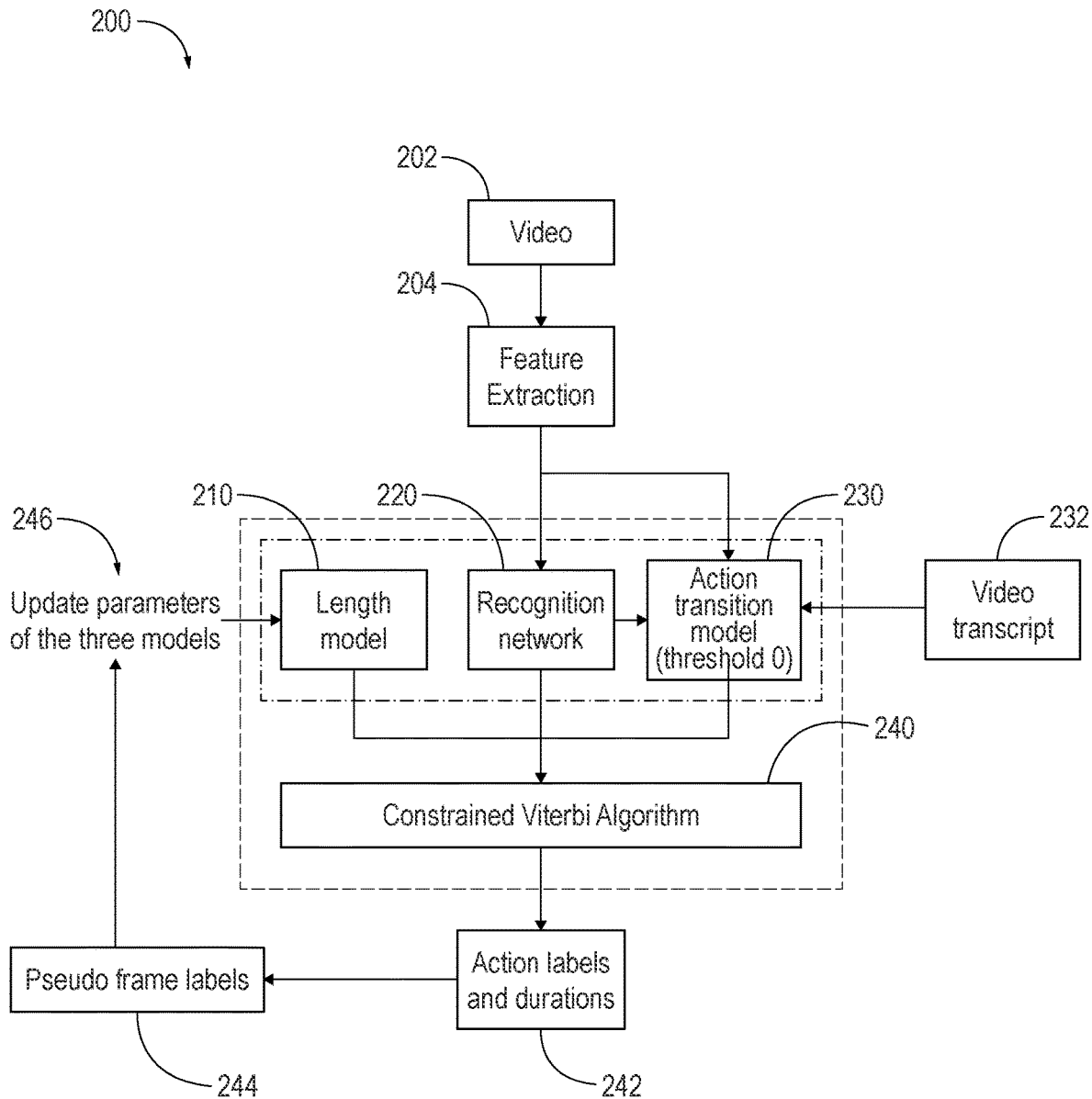
FIG. 2 is an exemplary component diagram of a system for training a weakly-supervised action segmentation model, according to one aspect.

FIG. 2 is an exemplary component diagram of a system 200 for weakly-supervised action segmentation which may be a system for training a weakly-supervised action segmentation model, according to one aspect. As seen in FIG. 2, video 202 may have features extracted 204. These extracted features may be fed to a recognition network 220 and an action transition model 230 with a similarity threshold set to zero so as to stick to the video transcript 232 for training. The length model 210 may provide an estimated length for the corresponding estimated action from the recognition network 220. The outputs from the length model 210, the recognition network 220, and the action transition model 230 may be fed to the segmentation model 240, which may be a constrained Viterbi algorithm. The segmentation model 240 may output actions labels and durations for the actions 242, which may be utilized to generate pseudo frame labels for the video 202, and the parameters of the length model 210, the recognition network, and the action transition model 230 may be updated 246.

Figure 3:
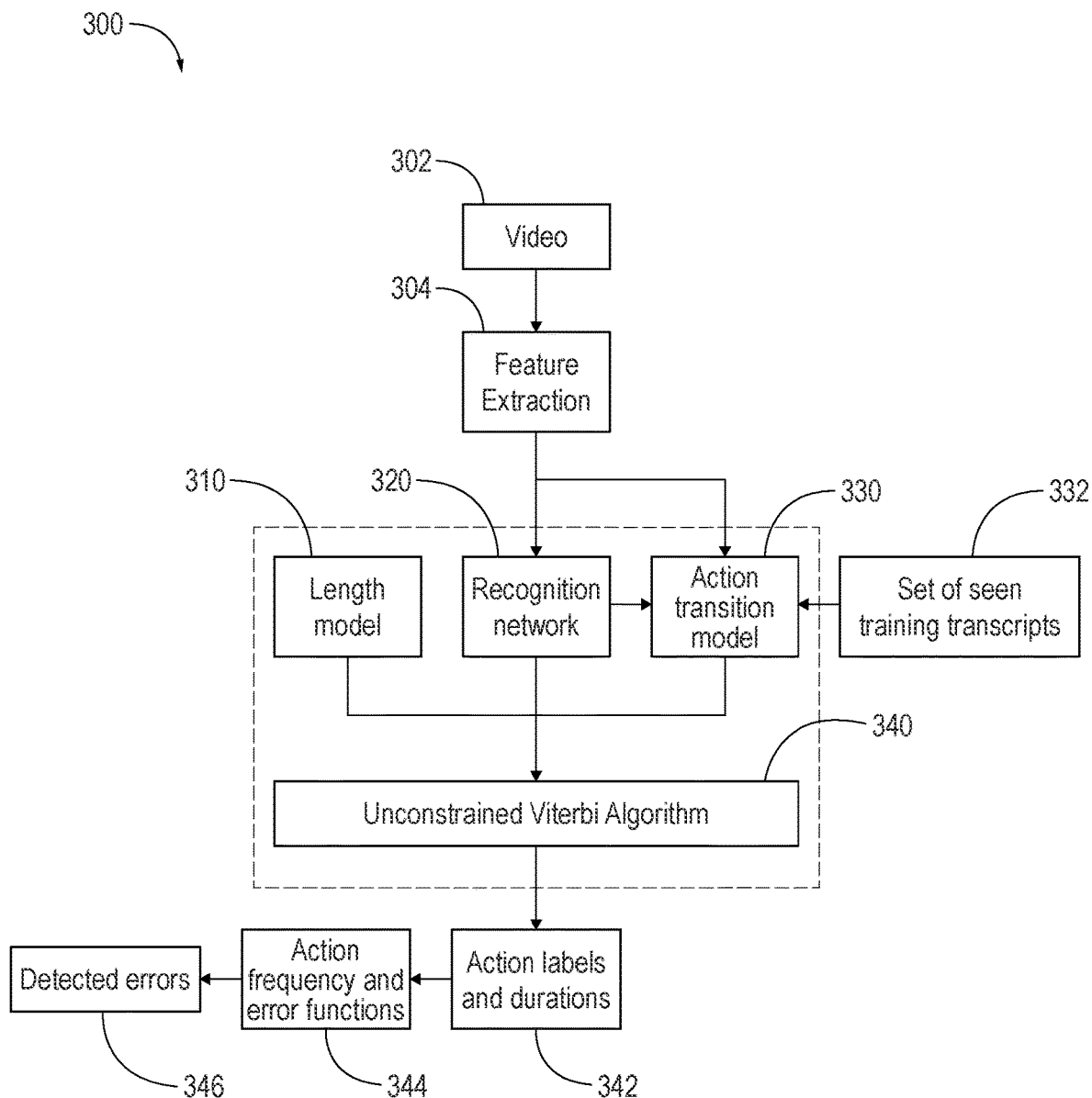
FIG. 3 is an exemplary component diagram of a system for weakly-supervised action segmentation, according to one aspect.

FIG. 3 is an exemplary component diagram of a system 300 for weakly-supervised action segmentation, according to one aspect. As seen in FIG. 3, video 302 may have features extracted 304. These extracted features may be fed to a recognition network 320 and an action transition model 330 which may or may not utilize the training transcripts 332. The length model 310 may provide an estimated length for the corresponding estimated action from the recognition network 320. The outputs from the length model 310, the recognition network 320, and the action transition model 330 may be fed to the hybrid segmentation model 340, which may be an unconstrained Viterbi algorithm. The hybrid segmentation model 340 may output actions labels and durations for the actions 342, which may be utilized to action frequency 344, and errors may be detected at 346.

Figure 4:
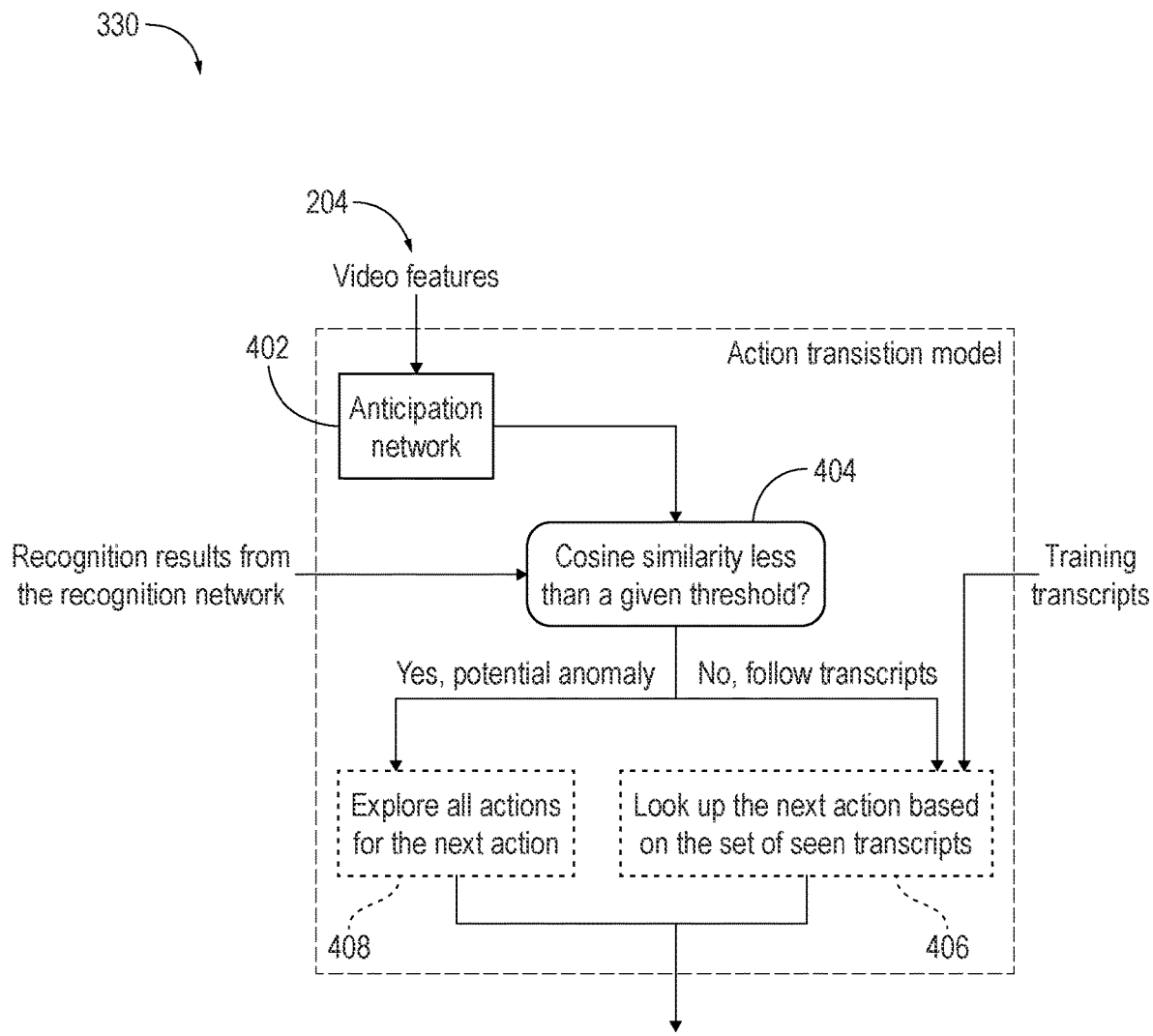
FIG. 4 is an exemplary component diagram of an architecture for an action transition model for the system for weakly-supervised action segmentation of FIG. 3, according to one aspect.

FIG. 4 is an exemplary component diagram of an architecture for an action transition model for the system for weakly-supervised action segmentation of FIG. 3, according to one aspect. An anticipation network 402 of the action transition model 330 may be trained during a training phase associated with a constrained version of the hybrid segmentation model. The action transition model may generate the potential subsequent action based on feeding one or more of the features to an anticipation network to generate an expected action for the current frame of the video and based on a comparison 404 between the expected action for the current frame and the predicted action score for the current frame. If the comparison 404 is greater than a similarity threshold, generating 406 the potential subsequent action based on a transcript of one or more known sequences of actions. If the comparison is less than a similarity threshold, generating 408 the potential subsequent action based on exploring a universe of possible actions.

Figure 5:
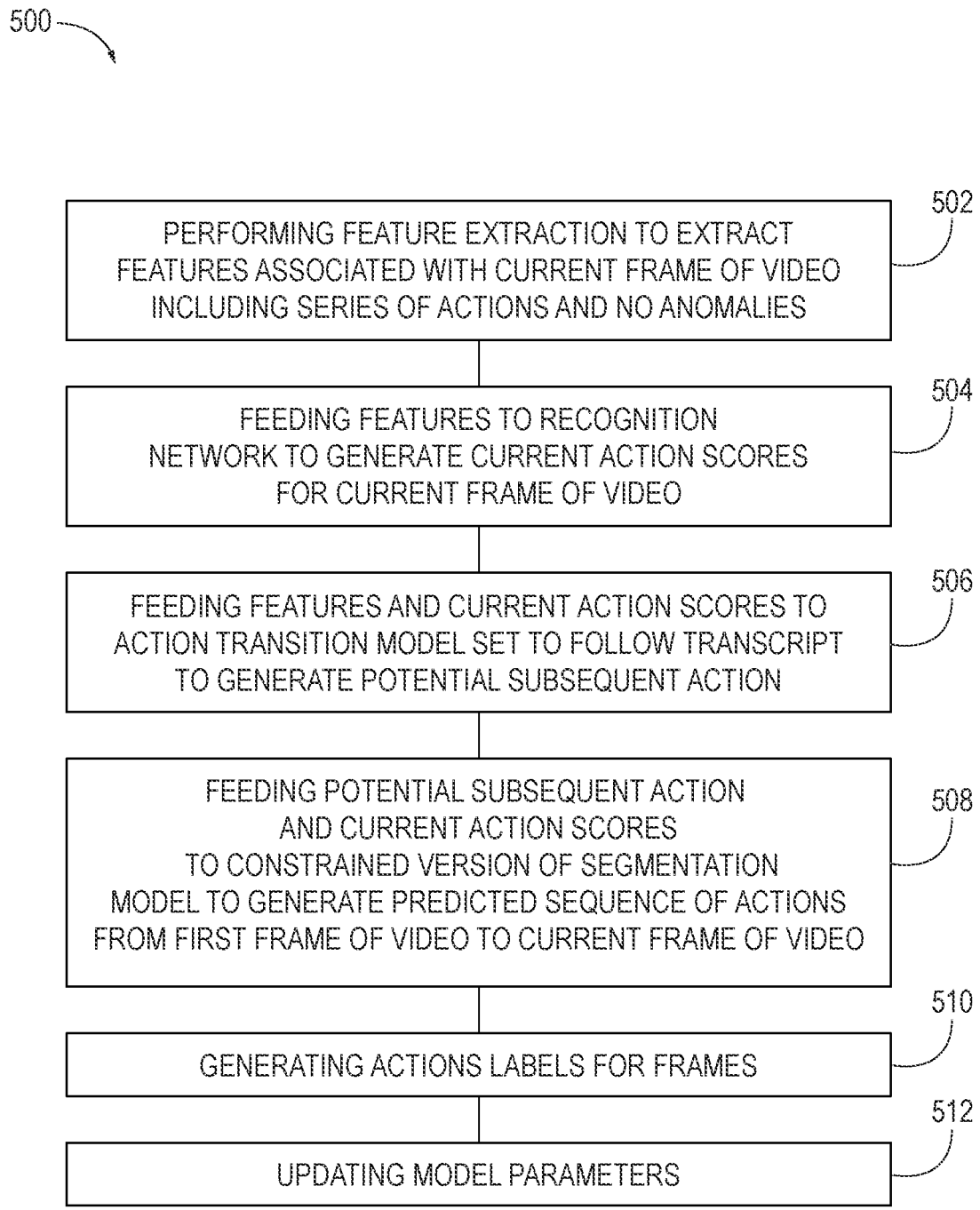
FIG. 5 is an exemplary flow diagram of a computer-implemented method for training a weakly-supervised action segmentation model, according to one aspect.

FIG. 5 is an exemplary flow diagram of a computer-implemented method 500 for training a weakly-supervised action segmentation model, according to one aspect. The computer-implemented method for training a weakly-supervised action segmentation model may include performing 502 feature extraction to extract features associated with current frame of video including series of actions and no anomalies, feeding 504 features to recognition network to generate current action scores for current frame of video, feeding 506 features and current action scores to action transition model set to follow transcript to generate potential subsequent action, feeding 508 potential subsequent action and current action scores to constrained version of segmentation model to generate predicted sequence of actions from first frame of video to current frame of video, generating 510 action labels for frames, and updating 512 model parameters.

Figure 6:
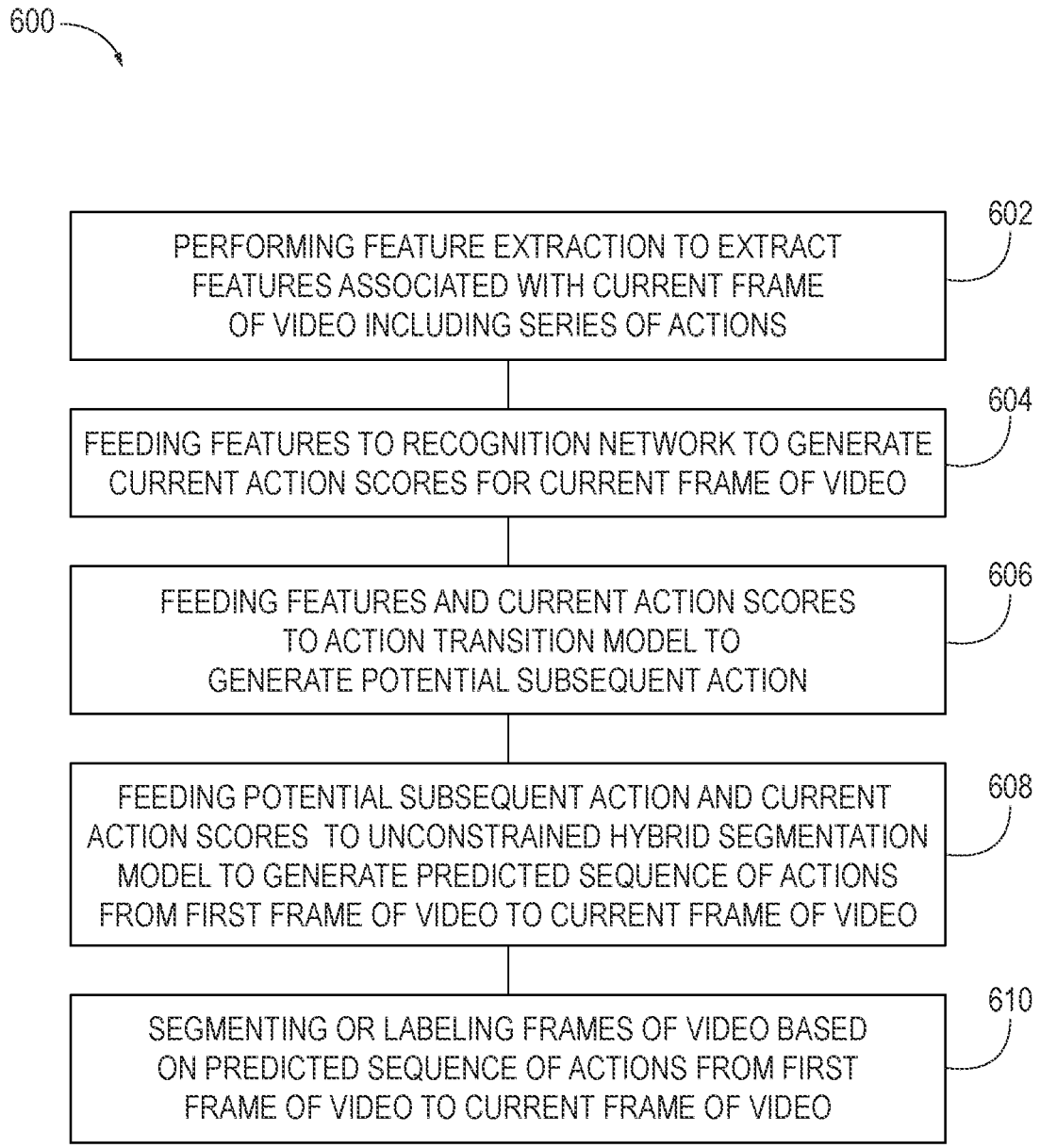
FIG. 6 is an exemplary flow diagram of a computer-implemented method for weakly-supervised action segmentation, according to one aspect.

FIG. 6 is an exemplary flow diagram of a computer-implemented method 600 for weakly-supervised action segmentation, according to one aspect. The computer-implemented method 600 for weakly-supervised action segmentation may include performing 602 feature extraction to extract features associated with current frame of video including series of actions, feeding 604 features to recognition network to generate current action scores for a current frame of video, feeding 606 features and current action scores to action transition model to generate potential subsequent action, feeding 608 potential subsequent action and current action scores to unconstrained hybrid segmentation model to generate predicted sequence of actions from first frame of video to current frame of video, and segmenting or labeling 610 frames of video based on predicted sequence of actions from first frame of video to current frame of video.

Figure 7:
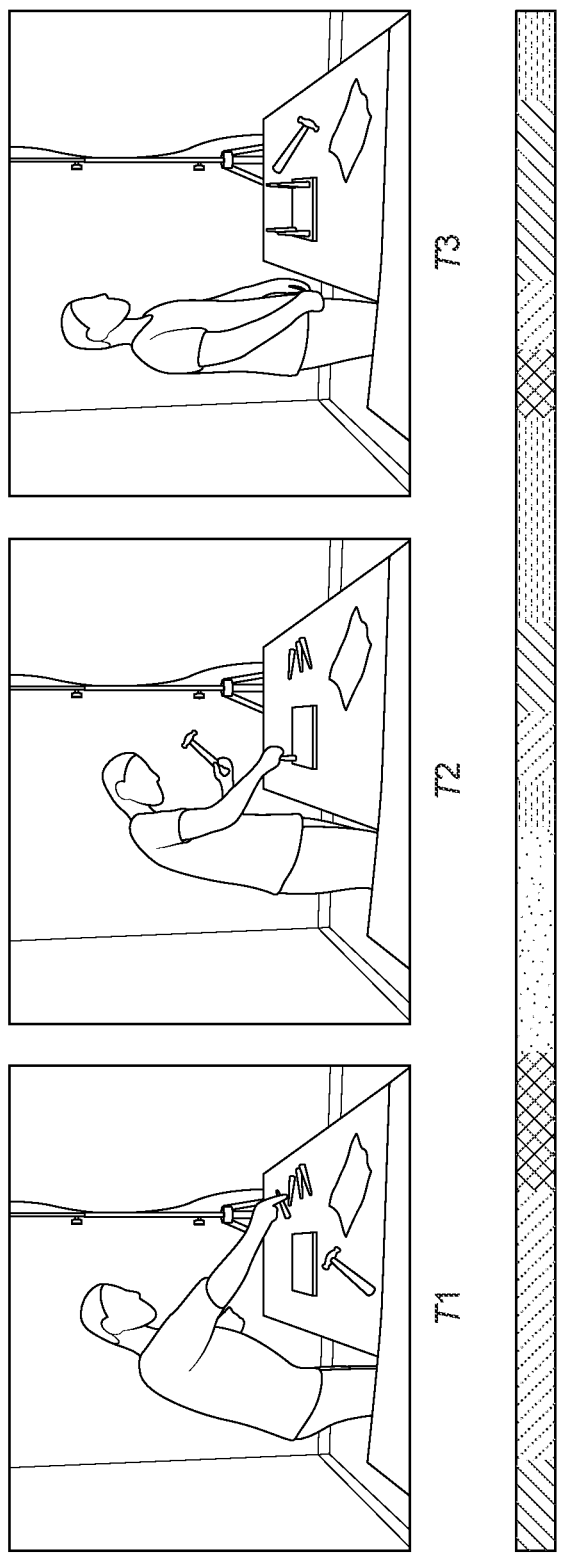
FIG. 7 is an exemplary illustration of video in association with the system for weakly-supervised action segmentation of FIGS. 1-3, according to one aspect.

FIG. 7 is an exemplary illustration of video in association with the system for weakly-supervised action segmentation of FIGS. 1-3, according to one aspect. For example, different tasks T1, T2, T3 are shown in connection with assembly of an object. The legend on the bottom of FIG. 7 is an exemplary illustration of a legend for the classifications of different actions which are utilized in connection with the assembly of the objects in chronological order, for example.

Figure 8:
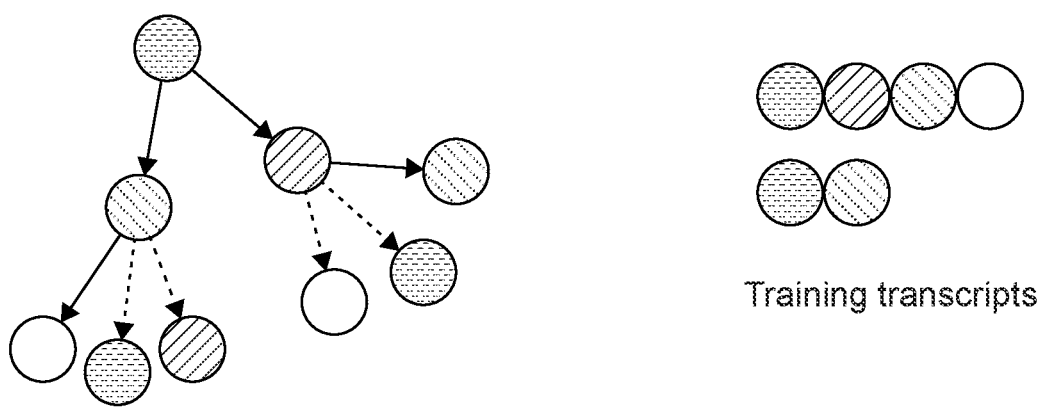
FIG. 8 is an exemplary illustration of segmentation in association with the system for weakly-supervised action segmentation of FIGS. 1-3, according to one aspect.

FIG. 8 is an exemplary illustration of segmentation in association with the system for weakly-supervised action segmentation of FIGS. 1-3, according to one aspect. According to one aspect, the unconstrained segmentation of FIG. 8 may not necessarily be limited to the training transcripts, shown on the right. For example, if a comparison between an expected action for a current frame and a predicted action score for the current frame is greater than a similarity threshold, then the training transcripts may be utilized. On the other hand, if the comparison between the expected action for the current frame and the predicted action score for the current frame is less than the similarity threshold, then a set of all possible actions may be explored.

Figure 9:
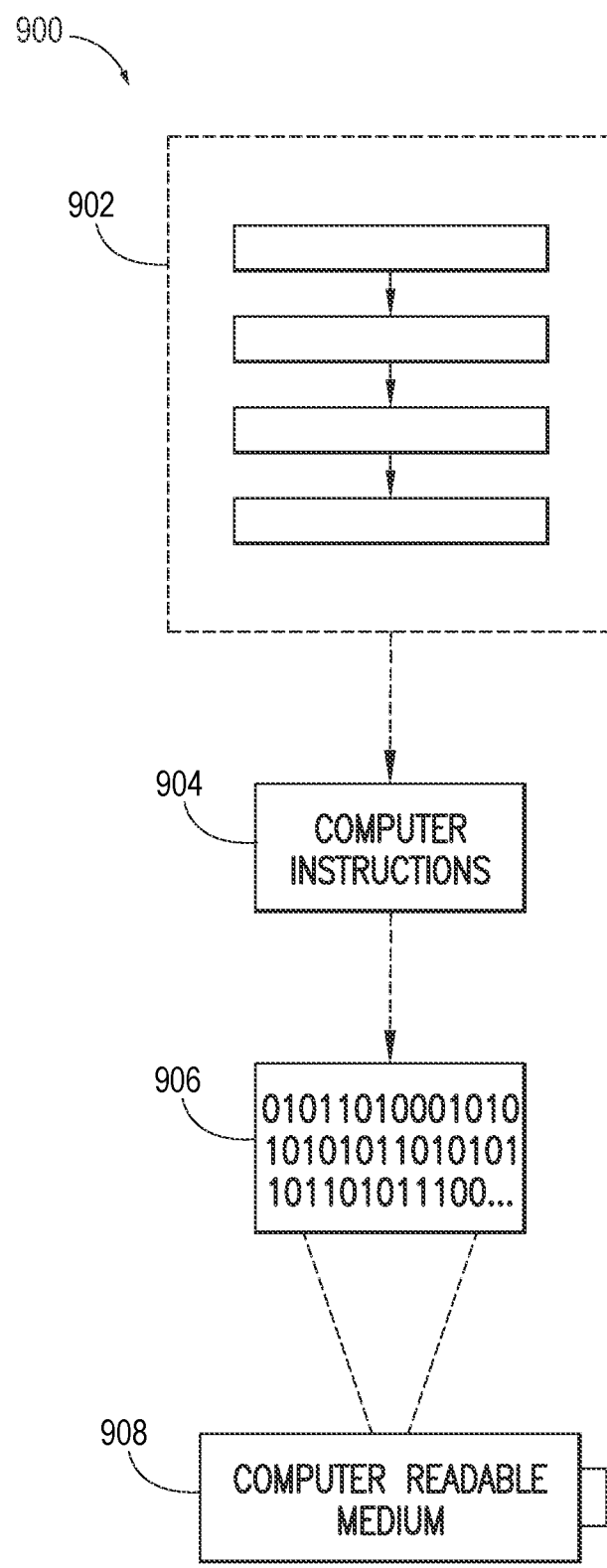
FIG. 9 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This encoded computer-readable data 906, such as binary data including a plurality of zero's and one's as shown in 906, in turn includes a set of processor-executable computer instructions 904 configured to operate according to one or more of the principles set forth herein. In this implementation 900, the processor-executable computer instructions 904 may be configured to perform a method 902, such as the computer-implemented method 500 of FIG. 5 and the computer-implemented method 600 of FIG. 6. In another aspect, the processor-executable computer instructions 904 may be configured to implement a system, such as the system 100 for weakly-supervised action segmentation of FIGS. 1-3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
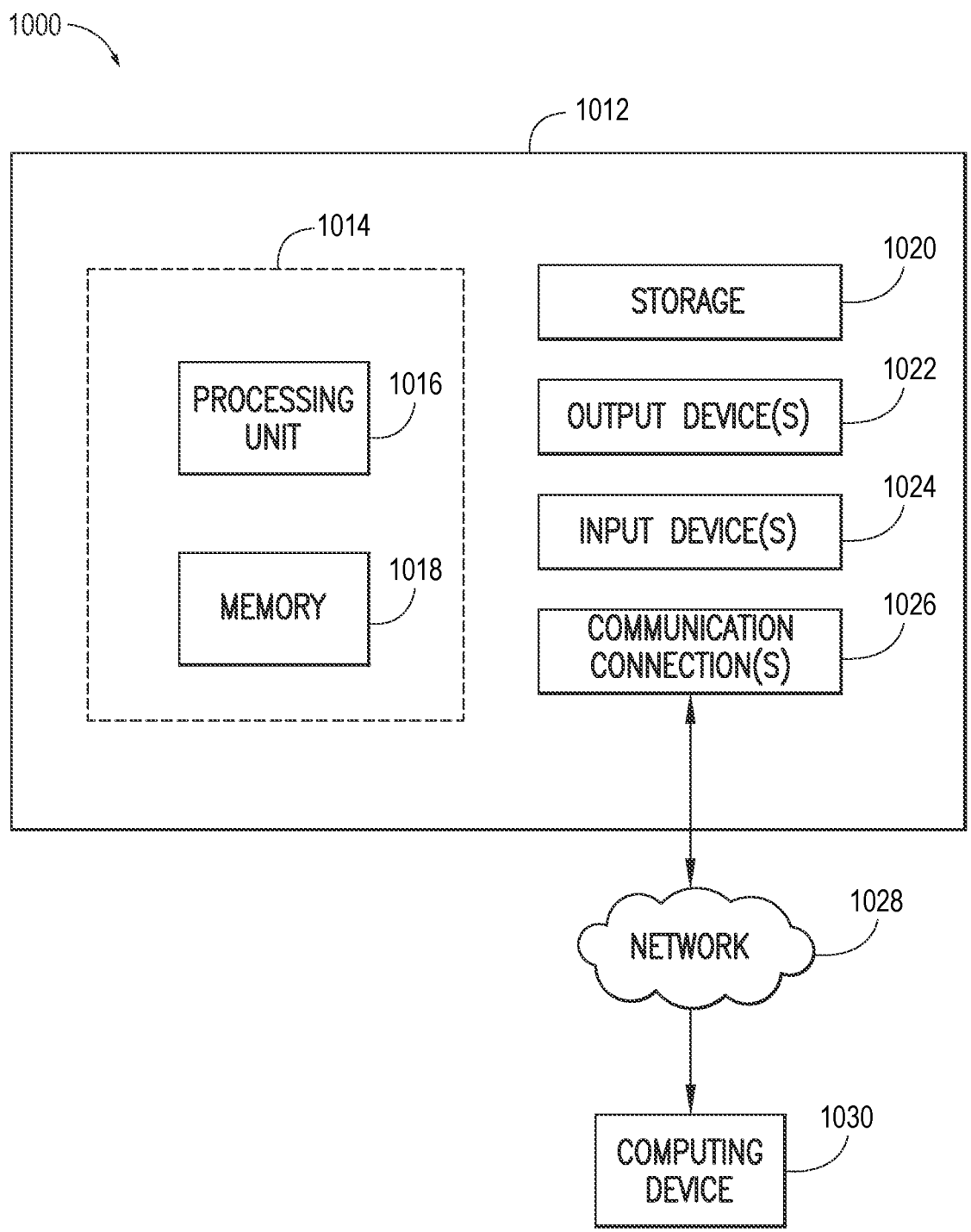
FIG. 10 is an illustration of an example computing environment where one or more of the provisions set forth herein are implemented, according to one aspect.

FIG. 10 and the following discussion provide a description of a suitable computing environment to implement aspects of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 10 illustrates a system 1000 including a computing device 1012 configured to implement one aspect provided herein. In one configuration, the computing device 1012 includes at least one processing unit 1016 and memory 1018. Depending on the exact configuration and type of computing device, memory 1018 may be volatile, such as RAM, non-volatile, such as ROM, flash memory, etc., or a combination of the two. This configuration is illustrated in FIG. 10 by dashed line 1014.

In other aspects, the computing device 1012 includes additional features or functionality. For example, the computing device 1012 may include additional storage such as removable storage or non-removable storage, including, but not limited to, magnetic storage, optical storage, etc. Such additional storage is illustrated in FIG. 10 by storage 1020. In one aspect, computer readable instructions to implement one aspect provided herein are in storage 1020. Storage 1020 may store other computer readable instructions to implement an operating system, an application program, etc. Computer readable instructions may be loaded in memory 1018 for execution by the at least one processing unit 1016, for example.

The term "computer readable media" as used herein includes computer storage media. Computer storage media includes volatile and nonvolatile, removable, and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1012. Any such computer storage media is part of the computing device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1012 includes input device(s) 1024 such as keyboard, mouse, pen, voice input device, touch input device, infrared cameras, video input devices, or any other input device. Output device(s) 1022 such as one or more displays, speakers, printers, or any other output device may be included with the computing device 1012. Input device(s) 1024 and output device(s) 1022 may be connected to the computing device 1012 via a wired connection, wireless connection, or any combination thereof. In one aspect, an input device or an output device from another computing device may be used as input device(s) 1024 or output device(s) 1022 for the computing device 1012. The computing device 1012 may include communication connection(s) 1026 to facilitate communications with one or more other devices 1030, such as through network 1028, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

The invention claimed is:

1. A system for weakly-supervised action segmentation, comprising:
    a memory storing one or more instructions; and
    a processor executing one or more of the instructions stored on the memory to perform:
    performing feature extraction to extract one or more features associated with a current frame and a previous frame of a video including a series of one or more actions;
    feeding the one or more of features to a recognition network to generate a predicted action score for the current frame of the video;
    feeding the one or more of features and the predicted action score to an action transition model to generate a potential subsequent action; and
    feeding a segmentation result from the previous frame, the potential subsequent action, and the predicted action score to a hybrid segmentation model to generate a predicted sequence of actions from a first frame of the video to the current frame of the video and a segmentation result for the current frame.

2. The system for weakly-supervised action segmentation of claim 1, wherein the hybrid segmentation model generates the predicted sequence of actions based on a predicted action length for a predicted action associated with the predicted action score.

3. The system for weakly-supervised action segmentation of claim 1, wherein the action transition model generates the potential subsequent action based on a transcript of one or more known sequences of actions, the one or more of features, and the predicted action score.

4. The system for weakly-supervised action segmentation of claim 1, wherein the hybrid segmentation model generates a predicted sequence of action lengths corresponding to the predicted sequence of actions.

5. The system for weakly-supervised action segmentation of claim 4, wherein the processor detects one or more errors associated with the predicted sequence of action lengths and the predicted sequence of actions based on an error function.

6. The system for weakly-supervised action segmentation of claim 1, wherein the hybrid segmentation model is based on an unconstrained Viterbi algorithm.

7. A computer-implemented method for weakly-supervised action segmentation, comprising:
    performing feature extraction to extract one or more features associated with a current frame and a previous frame of a video including a series of one or more actions;
    feeding the one or more of features to a recognition network to generate a predicted action score for the current frame of the video;
    feeding the one or more of features and the predicted action score to an action transition model to generate a potential subsequent action; and
    feeding a segmentation result from the previous frame, the potential subsequent action, and the predicted action score to a hybrid segmentation model to generate a predicted sequence of actions from a first frame of the video to the current frame of the video and a segmentation result for the current frame.

8. The computer-implemented method for weakly-supervised action segmentation of claim 7, wherein the hybrid segmentation model generates the predicted sequence of actions based on a predicted action length for a predicted action associated with the predicted action score.

9. The computer-implemented method for weakly-supervised action segmentation of claim 7, wherein the action transition model generates the potential subsequent action based on a transcript of one or more known sequences of actions, the one or more of features, and the predicted action score.

10. The computer-implemented method for weakly-supervised action segmentation of claim 7, wherein the hybrid segmentation model generates a predicted sequence of action lengths corresponding to the predicted sequence of actions.

11. The computer-implemented method for weakly-supervised action segmentation of claim 10, comprising detecting one or more errors associated with the predicted sequence of action lengths and the predicted sequence of actions based on an error function.

12. The computer-implemented method for weakly-supervised action segmentation of claim 7, wherein the hybrid segmentation model is based on an unconstrained Viterbi algorithm.

13. A system for weakly-supervised action segmentation, comprising:
a memory storing one or more instructions; and
a processor executing one or more of the instructions stored on the memory to perform:
performing feature extraction to extract one or more features associated with a current frame and a previous frame of a video including a series of one or more actions;
feeding the one or more of features to a recognition network to generate a predicted action score for the current frame of the video;
feeding the one or more of features and the predicted action score to an action transition model to generate a potential subsequent action;
feeding a segmentation result from the previous frame, the potential subsequent action, and the predicted action score to a hybrid segmentation model to generate a predicted sequence of actions from a first frame of the video to the current frame of the video and a segmentation result for the current frame; and
segmenting or labeling one or more frames of the video based on the predicted sequence of actions from the first frame of the video to the current frame of the video.

14. The system for weakly-supervised action segmentation of claim 13, wherein the hybrid segmentation model generates the predicted sequence of actions based on a predicted action length for a predicted action associated with the predicted action score.

15. The system for weakly-supervised action segmentation of claim 13, wherein the action transition model generates the potential subsequent action based on a transcript of one or more known sequences of actions, the one or more of features, and the predicted action score.

16. The system for weakly-supervised action segmentation of claim 13, wherein the hybrid segmentation model generates a predicted sequence of action lengths corresponding to the predicted sequence of actions.

* * * * *